J. POWERS.
TIRE SET AND SPOKE CLAMP.
APPLICATION FILED OCT. 11, 1909.
985,836.
Patented Mar. 7, 1911.
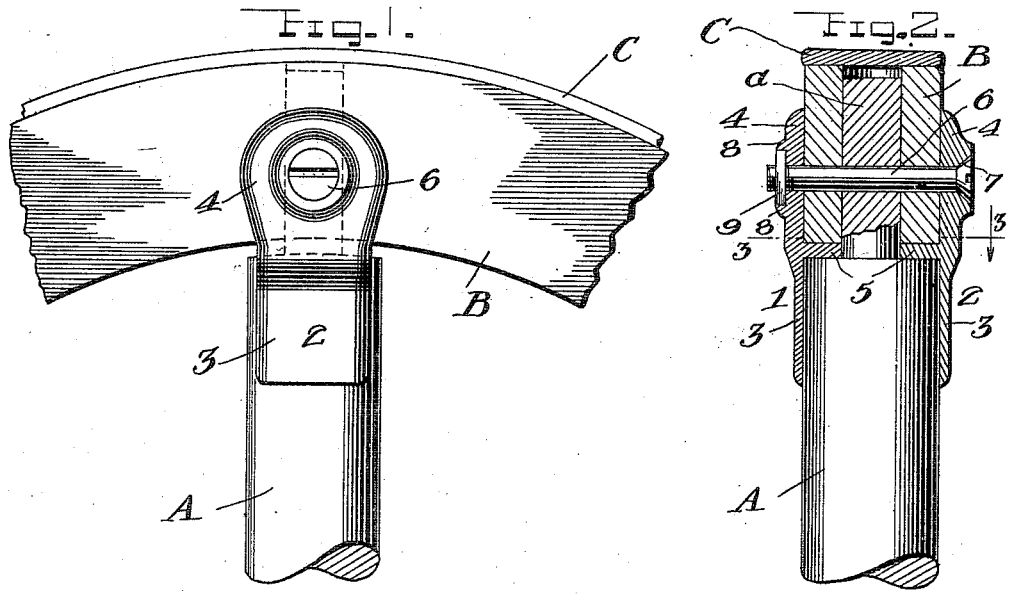
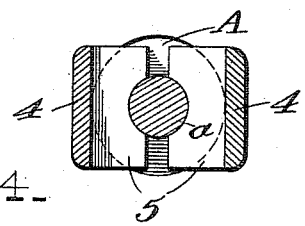
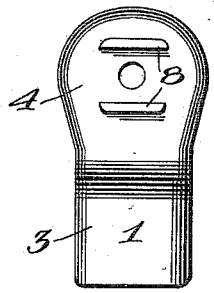
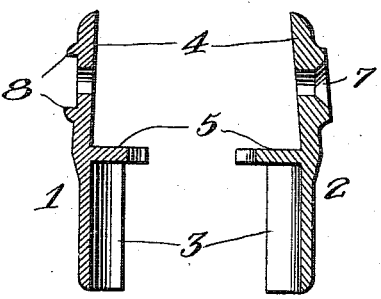
Witnesses
M. H. Rockwell
Donald H. Stewart.
Inventor
James Powers
By Sewell & Sewell
his Attorneys

UNITED STATES PATENT OFFICE.

JAMES POWERS, OF SANDUSKY, OHIO.

TIRE-SET AND SPOKE-CLAMP.

985,836.  Specification of Letters Patent.  Patented Mar. 7, 1911.

Application filed October 11, 1909. Serial No. 522,203.

*To all whom it may concern:*

Be it known that I, JAMES POWERS, a citizen of the United States, residing at Sandusky, in the county of Erie and State of Ohio, have invented a new and useful Tire-Set and Spoke-Clamp, of which the following is a specification, reference being made to the accompanying drawings, in which—

Figure 1 is a side elevation of a segment of the rim and portion of one spoke of a carriage wheel, and my improved tire set and spoke clamp applied thereto. Fig. 2 is a vertical cross-section of the same, with the spoke shown in elevation. Fig. 3 is a horizontal cross-section on the line 3—3 of Fig. 2. Fig. 4 is an outer face view of that member of the tire set and spoke clamp which does not appear in Fig. 1. Fig. 5 is a vertical cross-section through the two parts of the clamp disassembled.

When a spoke in a wheel breaks at the felly, the wheel is correspondingly weakened and the tire also loosens. My improved device is for the purpose of fastening such a broken spoke and at the same time expanding the felly to tighten or set the tire.

The device consists of a two-part clamp, the halves or members of which are designated 1 and 2. These parts are shaped to provide a socket for the outer end of the spoke A, and also to embrace the felly B. To this end, the said parts or members of the clamp are formed with parti-tubular or concave-faced lower portions 3 to fit the spoke, and with plate-like or flat-faced upper portions 4 to fit the felly; the concave and flat faces being of course on the inner or confronting sides of the respective parts; and between said faces are inwardly-projecting flanges 5 for insertion between the end of the spoke and the under side of the felly.

When the clamp is applied to the wheel, as seen in Figs. 1 and 2, the flanges 5 force the felly tight against the tire C, and incidentally serve also to help tighten the spoke. The parts of the clamp are or may be secured and drawn together by a screw-bolt 6 inserted through holes in their upper portions, and entered through the felly and spoke-pin *a*. One member of the clamp is shown provided with a counter-sunk hole 7 for the head of the screw-bolt, while the other member is shown formed on its outer side with ribs 8 constituting a lock for the nut 9 into which the screw-bolt is screwed.

I thus provide a simple, ready and efficient device for repairing a broken spoke without having to send the wheel to the shop.

I claim as my invention and desire to secure by Letters Patent:

1. A device of the character described comprising a two-part clamp each of the members of which have a parti-tubular or concaved faced lower portion and a flat medial upper portion, the tubular portions forming a spoke socket and the medial portions extending along opposite sides of the felly of a wheel and clamping the felly between them, said members having inwardly projecting flanges extending part way across the felly and between its normal inner surface and the end of a spoke.

2. A device of the character described comprising a separable felly-clamp having a spoke-socket, and a screw-bolt and fastening nut therefor securing the parts of the clamp together, one member of the clamp having a counter-sunk hole for the head of the bolt and the other member having its outer face formed with a lock for the nut.

JAMES POWERS.

Witnesses:
JOHN H. SCHILLER,
A. M. WAGNER.

---

Copies of this patent may be obtained for five cents each, by addressing the "Commissioner of Patents, Washington, D. C."